Feb. 15, 1949.　　　　W. E. FORD　　　　2,461,888
METER SETTER
Filed Jan. 27, 1945

INVENTOR.
WILBUR E. FORD,
BY
Hood & Hahn
ATTORNEYS.

Patented Feb. 15, 1949

2,461,888

UNITED STATES PATENT OFFICE 2,461,888

METER SETTER

Wilbur E. Ford, Wabash, Ind., assignor to The Ford Meter Box Company, Inc., Wabash, Ind., a corporation of Indiana Application January 27, 1945, Serial No. 574,901

2 Claims. (Cl. 285—3)

The present invention relates to meter setters. The primary object of the invention is to provide a setter for a water meter, or the like, in which the meter will be supported vertically above the service line, with the spuds of the meter a minimum distance above the service line, the setter being so constructed that its manufacturing cost is unusually low. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
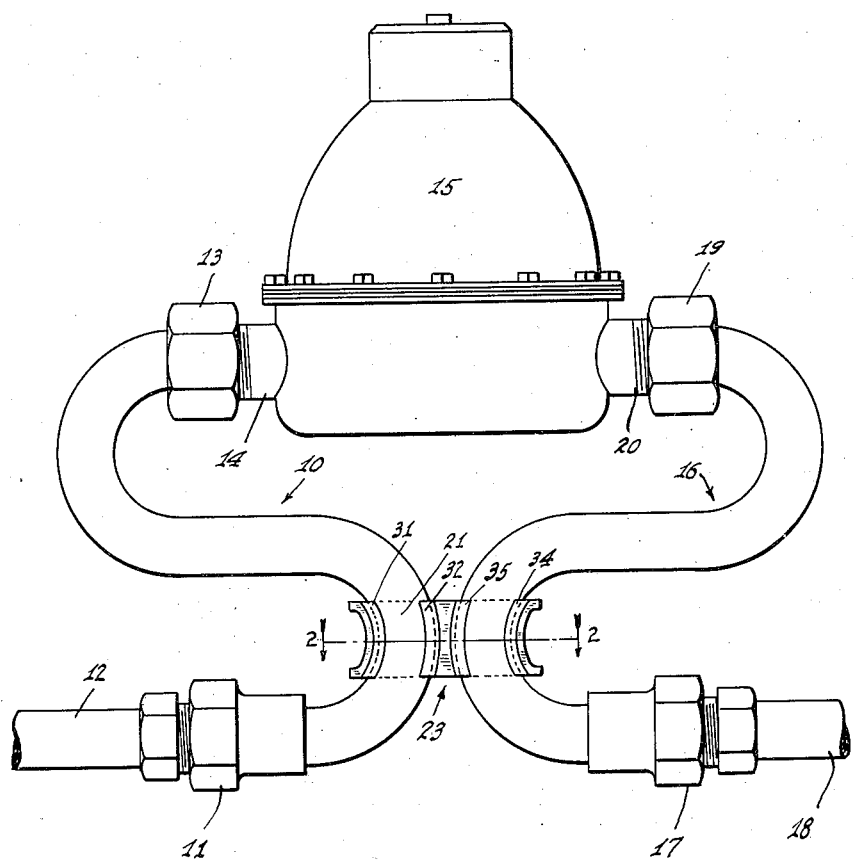
Figure 2:
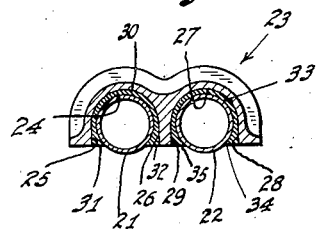

Fig. 1 is an elevation of a meter setter constructed in accordance with the present invention, and showing a meter connected to a service line through such setter; and Fig. 2 is a horizontal section taken substantially on the line 2—2 of Fig. 1.

The patent to John L. Ford No. 2,165,626 issued July 11, 1939, discloses a meter setter including a pair of conduits suitably formed to be connected in a service line and to a meter, said conduits being held together by a connector 33 which comprises a pair of allochiral castings formed with semi-cylindrical channels mating to receive portions of the two conduit bodies, said castings being secured, on opposite sides of the conduit bodies, through the medium of a thin film of solder. This construction has been satisfactory in service where the service lines are buried relatively deeply below the surface of the ground. In warmer climates, however, where the service lines are shallowly buried, the structure of the said patent is unsatisfactory because it locates the meter too high above the floor. To reduce the elevation of the meter to a minimum, in an organization generally of the character disclosed in the said Patent No. 2,165,626, the cooperating conduits are reduced in length and are bent to S-shape, as disclosed herein. When so modified, the closely adjacent portions of the two conduits are the lower bights of the two conduits, which portions are relatively sharply bent; and I have found that, in such an organization, it is feasible to connect the two units through the medium of a single connector element, instead of using the two mating connector elements disclosed in the said Patent No. 2,165,626.

Referring more particularly to the drawing, it will be seen that I have illustrated a conduit 10 bent to S-shape and provided at one end with a coupling 11 for connection to a service pipe end 12, and at the other end with a coupling 13 for connection to one spud 14 of a meter 15. I have illustrated also an identical, but allochirally arranged, S-shaped conduit 16 provided at one end with a coupling 17 for connection to the opposite end 18 of the service line, and provided at its other end with a coupling 19 for connection to the other spud 20 of the meter 15.

The two conduits 10 and 16 are arranged with their lower bights 21 and 22 in substantial juxtaposition, and a connector element, indicated generally by the reference numeral 23, is associated with said substantially juxtaposed portions of the two conduits, for holding the two conduits in assembled relation.

In Fig. 2, the details of the connector element 23 are illustrated. Said element is formed with a channel 24 curved to correspond with the curvature of the bight 21 of the conduit 10. The bottom portion of said channel is semi-cylindrical, being formed upon a diameter somewhat larger than the outside diameter of the portion 21 of the conduit 10. Said channel is formed to provide a mouth portion defined by parallel walls 25 and 26 having a projecting extent less than the radius of the conduit portion 21. Thus, when the axis of the conduit portion 21 is located upon the center of curvature of the base portion of the channel 23, one-half the surface of the conduit portion 21 is concentric with, but spaced slightly from, the semi-cylindrical portion of the channel 24, while the opposite half portion of the surface of said conduit portion recedes from the walls 25 and 26, which walls project toward, but terminate short of, a plane tangent with the surface of the conduit portion 21 at the point most remote from the base of the channel 24. A filling of molten solder is interposed between the adjacent walls of the conduit and its channel, and the solder is suitably worked to form fillets at 31 and 32 between the walls 25 and 26 and those portions of the conduit surface which recede from said walls, thus effectively locking the conduit in place.

The connector 23 is similarly formed with a suitable channel 27, curved to conform to the curvature of the portion 22 of the conduit 16. The base portion of the channel 27 is concentric with, but formed upon a diameter slightly larger than that of, the conduit section 22; and the channel 27, like the channel 24, is provided with parallel walls 28 and 29 projecting beyond the center of curvature of the base of the channel a distance less than a radius of the conduit section 22. A layer of solder 33 is interposed between the conduit section 22 and the walls of the channel 27, and the solder is suitably worked to provide fillets 34 and 35.

It will be clear that, in an organization such as that disclosed in the Ford Patent No. 2,165,626, a single connector element would not be effective because turning movement of one of the conduits, resulting from lateral pressure applied either to the upper portion or to the lower portion of the conduit, is resisted only by the skin tension of the solder film; whereas, in the present organization, such turning movement is prevented by the curvature of the channels 24 and 27 and of the conduit portions received therein.

I claim as my invention:

1. A meter setter comprising a pair of identical S-shaped conduits allochirally arranged and with the lower bights of said tubes arranged substantially in juxtaposition, and a holder associated with both of said bights and comprising a fitting formed with two oppositely curved channels, each of said channels being adapted to receive a portion of one of said bights, each of said channels further comprising a bottom portion of semi-cylindrical cross section upon a diameter slightly greater than the outside diameter of its associated conduit portion, and a mouth portion formed by parallel walls projecting beyond the edges of said semi-cylindrical portion, and a layer of solder or the like interposed between the wall of each channel and its associated conduit portion, and formed to provide fillets extending from near the termini of said parallel walls into contact with said conduit portion.

2. A meter setter comprising a pair of identical S-shaped conduits allochirally arranged and with the lower bights of said tubes arranged substantially in juxtaposition, and a holder associated with both of said bights and comprising a fitting formed with two oppositely curved channels, each of said channels being adapted to receive a portion of one of said bights, each of said channels further comprising a bottom portion of semi-cylindrical cross section upon a diameter slightly greater than the outside diameter of its associated conduit portion, and a mouth portion formed by parallel walls having a projecting extent less than the radius of said associated conduit portion, and a layer of solder or the like interposed between the wall of each channel and its associated conduit portion, and formed to provide fillets extending from near the termini of said parallel walls into contact with said conduit portion.

WILBUR E. FORD.

REFERENCES CITED

The following references are of record in the file of this patent:

UNITED STATES PATENTS

| Number | Name | Date |
|---|---|---|
| 2,165,626 | Ford | July 11, 1939 |

FOREIGN PATENTS

| Number | Country | Date |
|---|---|---|
| 584,985 | Germany | Sept. 14, 1933 |